US007931532B2

(12) United States Patent
Johnson

(10) Patent No.: US 7,931,532 B2
(45) Date of Patent: Apr. 26, 2011

(54) RANDOMLY AWARDED PROGRESSIVE JACKPOTS

(75) Inventor: Bradley W. Johnson, Henderson, TN (US)

(73) Assignee: Paltronics, Inc., Las Vegas, NV (US)

( * ) Notice: Subject to any disclaimer, the term of this patent is extended or adjusted under 35 U.S.C. 154(b) by 0 days.

(21) Appl. No.: 12/591,922

(22) Filed: Dec. 4, 2009

(65) Prior Publication Data

US 2010/0087245 A1 Apr. 8, 2010

Related U.S. Application Data

(62) Division of application No. 09/876,546, filed on Jun. 6, 2001, now Pat. No. 7,651,394.

(51) Int. Cl.
*A63F 13/00* (2006.01)

(52) U.S. Cl. .............................. 463/27; 463/20; 463/26

(58) Field of Classification Search .................... 463/20, 463/25, 26, 27, 28
See application file for complete search history.

(56) References Cited

U.S. PATENT DOCUMENTS 4,339,798 A 7/1982 Hedges et al.
4,467,424 A 8/1984 Hedges et al.
4,643,425 A 2/1987 Herzenberger
4,775,151 A 10/1988 Berry
4,856,787 A 8/1989 Itkis
4,926,327 A 5/1990 Sidley
5,116,055 A 5/1992 Tracy
5,249,800 A 10/1993 Hilgendorf et al.
5,280,909 A 1/1994 Tracy
5,288,077 A 2/1994 Jones
5,364,104 A * 11/1994 Jones et al. .................. 273/292
5,377,973 A 1/1995 Jones et al.
5,377,994 A 1/1995 Jones
5,382,025 A 1/1995 Sklansky et al.
5,417,430 A 5/1995 Breeding
5,472,194 A 12/1995 Breeding et al.
5,486,005 A 1/1996 Neal
5,584,763 A 12/1996 Kelly et al.
5,611,730 A 3/1997 Weiss
5,707,285 A 1/1998 Place et al.
5,741,183 A 4/1998 Acres et al.
5,743,800 A 4/1998 Huard et al.

(Continued)

OTHER PUBLICATIONS

The Gaming Industry, Introduction and Perspectives, International Gaming Institute, John Wiley & Sons: New York, 1996, Chapter 10.

(Continued)

*Primary Examiner* — James S McClellan
(74) *Attorney, Agent, or Firm* — Nixon & Vanderhye P.C.

(57) ABSTRACT

The invention is a method and a device for adding a bonus prize component to wagering games such as those played in gambling casinos. A player obtaining a predetermined combination in the underlying game wins the bonus prize. This might be a predetermined combination of playing cards in a card game or a predetermined combination on the reels of a slot machine. The bonus prize may require a separate side wager to qualify. The bonus prize is randomly chosen from a group of bonus prizes that includes an incrementing jackpot. The device for practicing the method includes a prize wheel that is spun to randomly choose the bonus prize, and an incrementing device with attached jackpot display for generating and showing the current amount of the incrementing jackpot. Upon winning the incrementing jackpot, the incrementing stops and the player wins the current amount shown on the display. The incrementing jackpot is subsequently reset and the incrementing resumed.

15 Claims, 8 Drawing Sheets

U.S. PATENT DOCUMENTS

| | | | |
|---|---|---|---|
| 5,762,552 A | 6/1998 | Vuong et al. | |
| 5,788,573 A | 8/1998 | Baerlocher et al. | |
| 5,794,964 A | 8/1998 | Jones et al. | |
| 5,795,225 A | 8/1998 | Jones et al. | |
| 5,830,069 A | 11/1998 | Soltesz et al. | |
| 5,848,932 A | 12/1998 | Adams | |
| 5,876,284 A | 3/1999 | Acres et al. | |
| 5,882,261 A | 3/1999 | Adams | |
| 5,911,418 A | 6/1999 | Adams | |
| 5,911,419 A | 6/1999 | Delaney et al. | |
| 5,911,626 A | 6/1999 | McCrea | |
| 5,913,726 A | 6/1999 | Jones et al. | |
| 5,934,999 A | 8/1999 | Valdez | |
| 5,941,773 A | 8/1999 | Harlick | |
| 5,951,011 A | 9/1999 | Potter et al. | |
| 6,004,207 A | 12/1999 | Wilson, Jr. et al. | |
| 6,012,982 A | 1/2000 | Piechowiak et al. | |
| 6,015,347 A | 1/2000 | Maahs et al. | |
| 6,024,642 A | 2/2000 | Stupak | |
| 6,080,063 A | 6/2000 | Khosla | |
| 6,083,105 A | 7/2000 | Romin et al. | |
| 6,102,799 A * | 8/2000 | Stupak | 463/27 |
| 6,179,290 B1 | 1/2001 | Maahs | |
| 6,210,275 B1 | 4/2001 | Olsen | |
| 6,217,448 B1 | 4/2001 | Olsen | |
| 6,224,484 B1 | 5/2001 | Okuda et al. | |
| 6,267,669 B1 | 7/2001 | Luciano, Jr. et al. | |
| 6,302,395 B1 | 10/2001 | Astaneha | |
| 6,336,857 B1 | 1/2002 | McBride | |
| 6,346,044 B1 | 2/2002 | McCrea et al. | |
| 6,379,247 B1 | 4/2002 | Walker et al. | |
| 6,485,368 B2 | 11/2002 | Jones et al. | |
| 6,612,575 B1 | 9/2003 | Cole et al. | |
| 6,712,695 B2 | 3/2004 | Mothwurf et al. | |
| 2001/0003709 A1 | 6/2001 | Adams | |

OTHER PUBLICATIONS

"Wheel of Fortune," The Original Game Show Page, Online, retrieved from the Internet on [Aug. 13, 2002[, URL:<wysiwyg://9/http://www.chris-lambert.com/RULES/wheel.html>.

Kilby, Jim, Casino Operations Management, Johy Wiley & Sons, Inc., New York: 1998, Chapters 7 and 18.

* cited by examiner

RANDOMLY AWARDED PROGRESSIVE JACKPOTS

CROSS REFERENCE TO THE RELATED APPLICATION

This application is a divisional application of U.S. application Ser. No. 09/876,546, filed Jun. 6, 2001, allowed, the entire contents of which is incorporated herein by reference.

BACKGROUND OF THE INVENTION

1. Field of Invention

The present invention relates to devices and methods for awarding a bonus prize based on wagering on a primary wagering game or from side wagering on the bonus prize.

2. Description of Related Art

Mechanical Gaming Devices

Gaming devices allow players to play games. A large variety of such gaming devices have been developed over the years, particularly of the mechanical variety and more recently of the electro-mechanical variety. Reel-type slot machines are one well-known variety of gaming devices that utilize a plurality of cylindrical reels with various indicia around the outer surface of each reel, such as fruit or bells. Coins are inserted into the slot machine. Wagers are placed using buttons located on the front of the slot machine. The reels are spun by players pulling a lever at the side of the slot machine or by pushing a button located at the front of the slot machine. The stopping of the reels is random, the spinning and stopping being controlled by a reel spinning and sensing device in the slot machine. Payouts are based on obtaining particular predetermined combinations of indicia displayed on the reels.

Card games such as blackjack and five-card stud are played using conventional playing cards displaying various standard indicia. In casinos, card games are played on gaming devices that are semi-circular card tables. The dealer stands behind the flat side of the card table and the players sit on stools along the circular side. The tabletop includes a felt cover having appropriate areas marked for placing wagers and for placing playing cards. Holders for holding chips can be affixed to the tabletop. This is a card game of the "live" type wherein the dealer physically controls play of the card game including wagering, the dealing of playing cards, and the payoff on wagers won by players.

Virtual Gaming Devices

During the last ten or so years, virtual gaming devices have been developed. An example of a virtual gaming device is video slot machines. Video slot machines have a video screen that displays a video image of virtual reels. An electronic controller within the slot machine controls the action of the virtual reels. Wagers are placed using buttons located on the front of the slot machine. The virtual reels are "spun" by the player pulling a lever at the side of the slot machine or by pushing a button located at the front of the slot machine. The electronic controller "spins" and stops each reel in a randomly chosen position similar to electro-mechanical slot machines. Payouts are based on obtaining particular predefined combinations of indicia displayed on the reels.

Virtual gaming devices also include video gaming devices for playing card games. Video card games are played on video card machines having a video screen for displaying virtual versions of conventional playing cards. Such card games include blackjack, twenty-one, and five-card stud, though typically for only a single player to play at a time. Coins are inserted into the video card machine and wagers are placed using buttons on the front of the video card machine. Virtual playing cards are dealt using buttons located on the front of the video card machine. The virtual playing cards are dealt from one or more decks of virtual cards and are displayed on the video screen. An electronic controller randomly chooses the virtual playing cards similar to the "live" version played with conventional playing cards. The players, using buttons located on the front of the video card machine, make hits and other actions necessary for play. Payouts are based on obtaining particular predetermined combinations of virtual playing cards.

A problem with gaming devices is that player enjoyment and excitement tends to wane over time unless their interest can be maintained. This is because playing the game "gets old" after awhile and players seek excitement at another gaming device or leave the gaming establishment such as a gambling casino.

Bonus Prizes

Since the players of the various casino games prefer games that maintain their interest and that provide excitement, and the casinos want to maximize their daily cash returns from each gaming device, it is desirable to both the players and to the casino to make games as interesting and exciting as possible. The maintained interest level and excitement provides more enjoyment for the players so they continue wagering longer, resulting in higher cash returns for the casino. Heightened awareness of gaming devices by posting potential payouts and by word-of-mouth also attracts more players who tend to play longer. The result is even greater commercial success for the gaming device. Therefore, in an effort to increase player interest and excitement, some gaming devices award bonus prizes in addition to the prizes that are awarded in the underlying or primary game when a predefined event occurs.

Random Bonus Prizes

In many casino gaming devices, the bonus prize depends on a randomly generated event. An example of such a bonus game in a gaming device can be found in U.S. Pat. No. 5,848,932 issued to Adams. One of the gaming devices described in this document comprises three reels and a prize wheel. When predetermined indicia are displayed on the reels of the primary game such as slots, the prize wheel can be activated to indicate a randomly selected bonus prize. The bonus prize is awarded in addition to any prizes awarded in the primary game.

Another example of a gaming device that includes a randomly generated bonus prize is disclosed in U.S. Pat. No. 5,707,285 issued to Place et al. The wagering gaming device and method described in this document is for randomly selecting bonus prizes for games such as blackjack, poker, and electronic games. The device uses a computer that generates a random generated number that is compared to a predefined pay table to determine the bonus prize. The bonus prize depends on which range of predefined numbers the random number falls within.

Jackpots

One form of bonus prize is a jackpot. This is an amount of money that can be won by players of a particular casino game or group of casino games. Jackpots are very effective in raising the excitement and enjoyment experienced by the players. Many people like to win money so they can buy whatever they want rather than receiving a predetermined non-money bonus prize that they might not need or want. A large jackpot attracts more players to the wagering games and gaming devices and encourages players to play longer. Ideally, the amount of the jackpot is prominently shown on a lighted display adjacent the gaming devices on which the jackpot can be won. All such jackpots known to date in the gaming industry are of one of three types, fixed jackpots, incrementing jackpots, or random jackpots.

Fixed Jackpots: A fixed jackpot is a predetermined amount of money that does not change based on the passage of time nor based on the amount of wagers placed on the primary game with which it, is associated. The level of player interest and excitement for fixed jackpots primarily depends on the amount of the fixed jackpot.

Incrementing Jackpots: An incrementing jackpot is an amount of money that starts at a lower predetermined amount, the minimum jackpot, and incrementally increases based on a predetermined scheme. The incrementing of the jackpot stops at an upper predetermined amount of money, the maximum jackpot. There are two types of incrementing jackpots depending on the incrementing scheme used, those that are time-based, and those that are progressive. Those that are time-based increase by a fixed amount of money at fixed time intervals. Conversely, those that are progressive increase over time proportionate to the amount of the wagers placed on the primary game with which the jackpot is associated.

Both types of incrementing jackpots can do one of two things upon reaching the maximum jackpot. The jackpot can hold at the maximum jackpot for a period of time such as the remainder of the week or until won. Alternatively, the jackpot can continue to move by scrolling. Scrolling can take two forms, the first form being to always increment the jackpot upwardly. When the maximum jackpot is reached, the jackpot jumps completely back to the lower jackpot to begin upwardly incrementing again. The second form of scrolling is to increment the jackpot both upwardly and downwardly. When the maximum jackpot is reached, the jackpot increments downwardly back to the lower jackpot, to begin upwardly incrementing again in a continuous manner until won. The level of player interest and excitement for incrementing jackpots primarily depends on the current amount of the jackpot and the speed at which the jackpot is upwardly incrementing.

Random Jackpots: A random jackpot is an amount of money that can be won based on a predefined table of possible individual amounts of money to win. The actual amount of money won in the random jackpot is not determined until the time the random jackpot is won. This may be accomplished in a similar manner to that for random bonus prizes wherein each possible individual amount of money is assigned a predefined range of numbers in a table. The larger the individual amount of money, the narrower the range of numbers assigned so as to decrease the odds of winning that jackpot. The smaller the individual amount of money, the larger the range of numbers assigned so as to increase the odds of winning that jackpot. Therefore, a greater number of smaller jackpots are won than larger jackpots. The level of player interest and excitement for random jackpots depends primarily on the amount of the jackpots and the probability of winning each jackpot.

A problem with such individual fixed jackpots, incrementing jackpots, and random jackpots is that they too, over time, become less interesting and exciting to players. The only effective way to increase player interest and excitement is to increase the amounts of the jackpots, which places a heavier financial burden on the casino and reduces casino profits.

Bonus Prizes in Card Games

Bonus prizes have been added to card games of the "live" type having a person dealing conventional playing cards at a casino table. One example is disclosed in U.S. Pat. No. 5,288,077 issued to Jones in which a progressive jackpot is included as a bonus component of the card game twenty-one. The players place their wager on the primary game of twenty-one. Additionally, each player has the option of making a side wager that makes the player eligible to win the progressive jackpot. If a player's twenty-one hand comprises one of a predefined arrangement of cards, then that player wins the entire amount showing on the progressive jackpot. If multiple players' twenty-one hands comprise one of the predefined arrangements of cards, then they share the progressive jackpot. The predefined arrangements of cards that constitute winning hands for the progressive jackpot component of the twenty-one game are chosen so as not to affect the strategy of play in the primary twenty-one game.

Other examples of including a bonus prize component into card games of the "live" type are disclosed in U.S. Pat. Nos. 5,794,964; 5,913,726; and 5,795,225 issued to Jones et al. The players first place their wagers on the primary card game. Each player then has the option of making a side wager that makes the player eligible to win part or all of a progressive jackpot. The side wagers are placed by depositing one or more gaming tokens into a slot of a device provided to receive the gaming tokens. The device increments a jackpot meter that displays the amount of the progressive jackpot based on the total number of gaming tokens deposited. If during play of that hand a player is dealt a predetermined combination of cards, that player wins a pre-selected percentage of the progressive jackpot based on a predefined table of paybacks for the particular predefined combination of cards. Unwon amounts of the jackpot carry over to the next hand. The device automatically decrements the jackpot meter whenever a winning hand is paid and resets the device for the next hand.

Yet another example of including a bonus prize component into card games of the "live" type is disclosed in U.S. Pat. No. 5,743,800 issued to Huard et al. Players place a side wager to qualify for the bonus prize component. A device then randomly chooses a winning card or combination of cards along with a person or persons eligible to win the bonus prize upon subsequent possession of the chosen card or combination of cards.

Bonus Prizes in Slots

Bonus prizes have also been added to slot machines. One example in an electro-mechanical slot machine is disclosed in U.S. Pat. No. 6,004,207 issued to Wilson, Jr. et al. The slot machine provides a payout on wins, which payout is multiplied by an incrementing multiplier when special indicia on a reel are also present on the payoff line. A counter is incremented each time another special indicia appears anywhere on the visible portions of the reels. The counter increases the value of the multiplier upon reaching a predetermined value. When a multiplied payout occurs, the multiplier is reset to a minimum value.

Networked Gaming Devices

One effort to increase player interest and excitement has been to connect multiple gaming devices in a network that awards a common bonus prize such as a jackpot. One example is disclosed in U.S. Pat. No. 5,941,773 issued to Harlick comprising a mystery jackpot controller. The controller connects to a plurality of electronic gaming devices that are networked together. Each of the gaming devices is provided with a network interface that signals the jackpot controller through the network on the occurrence of a predetermined operation of each gaming device. The jackpot controller generates and awards a bonus prize of a random jackpot on the receiving of a signal indicating the occurrence of one of the predetermined operations.

Prize Wheels

Prize wheels have been used as a way of increasing player interest and excitement. A prize wheel is divided into pie-shaped segments indicating various bonus prizes. The prize wheel is manually or automatically spun and comes to rest with a fixed pointer indicating which segment contains the bonus prize won. Virtual versions of prize wheels displayed on a video screen can also be used.

One example of including a bonus prize component using a prize wheel in a traditional card game of the "live" type is disclosed in U.S. Pat. No. 5,911,418 issued to Adams. The bonus game provides the players the opportunity to obtain a bonus prize by matching certain predefined hands resulting from the primary card game. A match permits the winning player or players to spin a prize wheel that is divided into a plurality of pie-shaped segments. Each segment indicates a prize such as doubling the winnings from the primary card game, or a second spin of the prize wheel. The winning player wins whatever is indicated by the particular segment that stops at a fixed indicator adjacent to the prize wheel. Players may be required to place a side wager to qualify for the bonus prize.

There is a continuing need for increasing the interest and excitement of casino gaming, and thus the revenues to the casinos.

SUMMARY OF INVENTION

1. Advantages of the Invention

One of the advantages of the present invention is that it provides increased player interest and excitement to primary wagering games by providing a jackpot that combines random jackpots, fixed jackpots, and incrementing jackpots.

A further advantage of the present invention is its adaptability as either a component of the primary wagering game or as a separate side wager.

Another advantage of the present invention is its adaptability to networked gaming devices.

These and other advantages of the present invention may be realized by reference to the remaining portions of the specification, claims, and abstract.

2. Brief Description of the Invention

The present invention comprises a method for including a random incrementing jackpot component in primary wagering games such as wagering games in casinos. The invention further comprises random incrementing jackpot devices for use with wagering gaming devices, and wagering gaming devices that include a random incrementing jackpot component.

The method of including a random incrementing jackpot component in a primary wagering game comprises the steps of requiring each of the one or more players to place a wager. The wagers are typically in the form of money or purchased gaming chips though non-money wagers such as non-purchased gaming chips or tokens can be used. A round of the primary wagering game is conducted. Each player participating in the jackpot component having a predetermined arrangement of indicia such as on playing cards or the reels of a slot machine, resulting from completion of the round is designated as a winning player. Each winning player is provided an opportunity to win a bonus prize that is randomly selected from a group of prizes that includes an incrementing jackpot. The other bonus prizes may include jackpots such as fixed jackpots or other non-money prizes. Preferably, each player wishing to participate in the jackpot component of the primary wagering game is required to place a side wager separate and distinct from the wager on the primary wagering game. The designation as a winner is then from among only those players having the predetermined arrangement of indicia whom placed a side wager.

The random incrementing jackpot device comprises a random prize generating device and an incrementing device. The incrementing device increments the amount of an incrementing jackpot from a minimum jackpot toward a maximum jackpot. The random prize-generating device randomly chooses one of a plurality of possible prizes, one of the possible prizes being the incrementing jackpot. The incrementing device can be stopped manually or automatically when the random prize-generating device chooses the incrementing jackpot.

The game device comprises the random incrementing jackpot device and a primary gaming device. The primary gaming device might be, for example, a casino card table for "live" playing using conventional playing cards, a video card machine using virtual cards, an electro-mechanical slot machine, or a video slot machine using virtual reels. The random incrementing jackpot device is operatively connected to the primary gaming device.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Preferred embodiments of the present invention are shown in the accompanying drawings wherein.

DESCRIPTION OF THE PREFERRED EMBODIMENT

Figure 1:
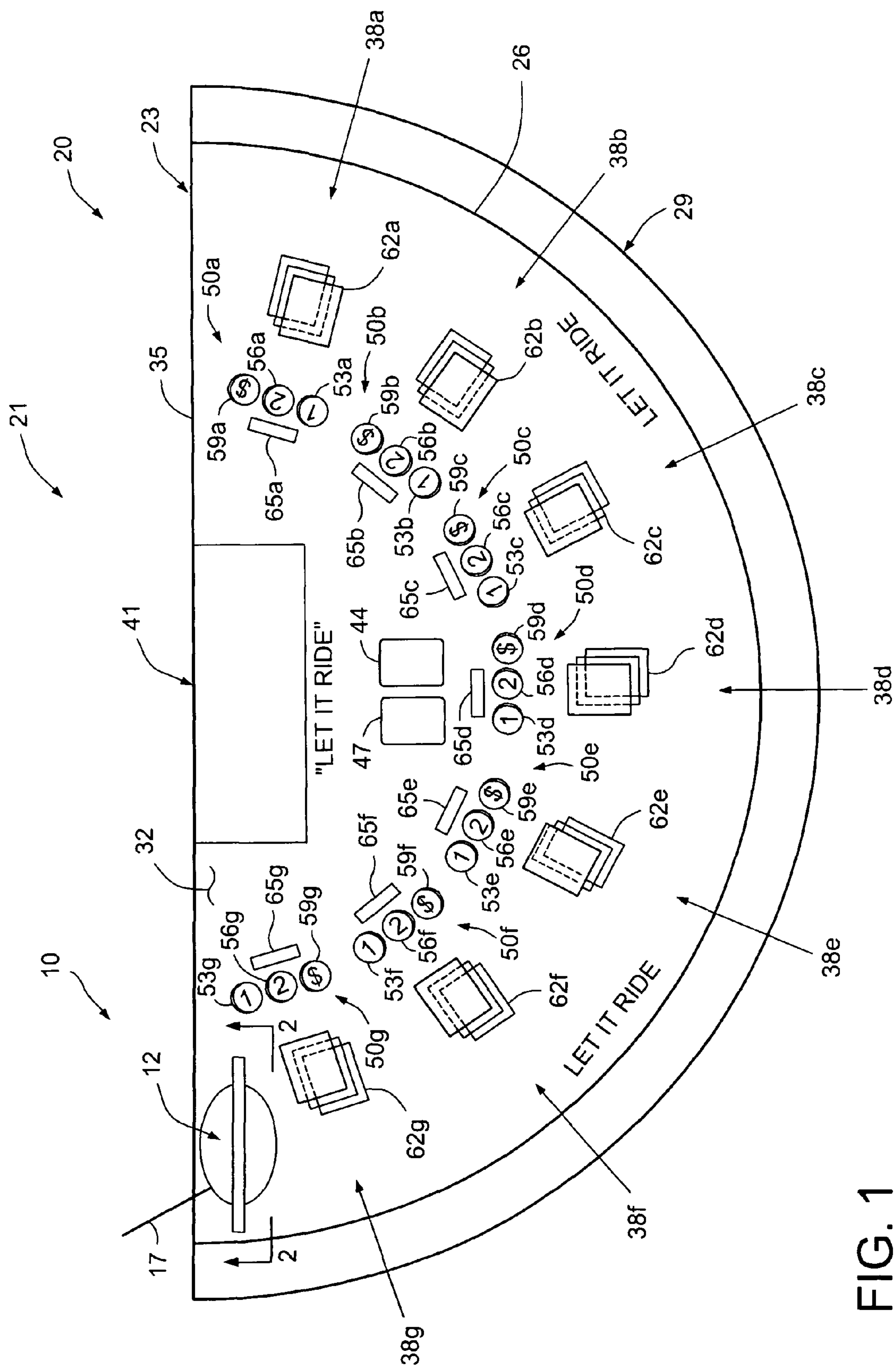
FIG. 1 is substantially a top plan view of a game device of the present invention comprising a blackjack table and a random incrementing jackpot device.
Figure 3:
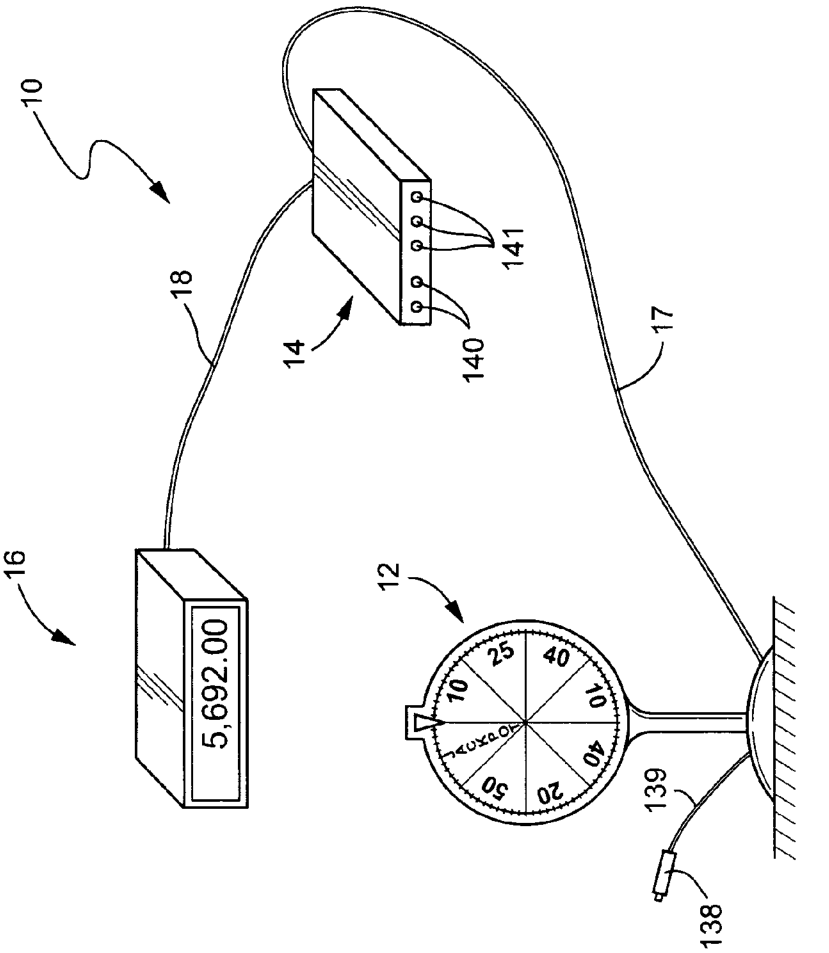
FIG. 3 is substantially a perspective view of the prize wheel, the micro-controller, and the jackpot display of the random incrementing jackpot device.
Figure 2:
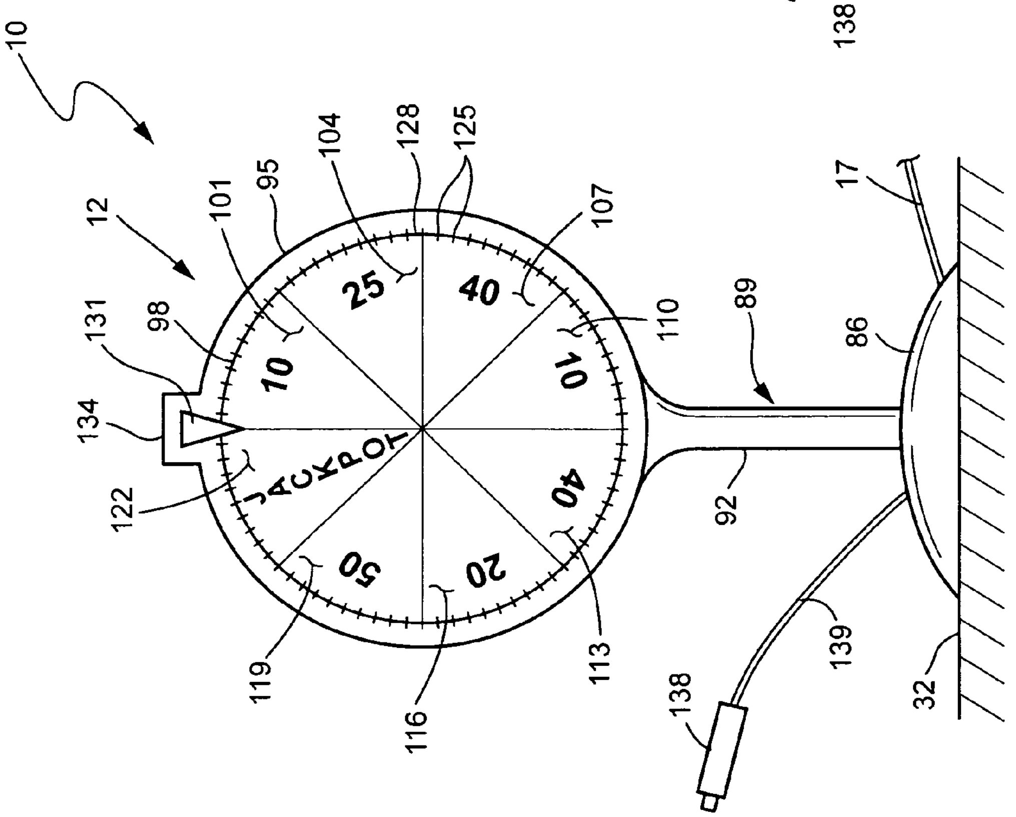
FIG. 2 is substantially a front elevational view of the prize wheel of the random incrementing jackpot device taken along line II in FIG. 1.

As seen in FIGS. 1-3, the present invention comprises a random incrementing jackpot device, generally indicated by reference number 10. Jackpot device 10 comprises a random prize generating device in the form of a prize wheel 12, an incrementing device in the form of a micro-controller 14, and a jackpot display 16. Respective cables 17 and 18 interconnect prize wheel 12, micro-controller 14, and jackpot display 16. Prize wheel 12 is used for randomly choosing a prize from a plurality of possible prizes, which includes the incrementing jackpot. Micro-controller 14 includes a meter (not shown) which increments the amount of the incrementing jackpot from a minimum jackpot to a maximum jackpot. Jackpot display 16 shows the amount of the incrementing jackpot.

Blackjack Table Using Random Incrementing Jackpots

Jackpot device 10 may be used with a variety of gaming devices on which players play a game. With continuing reference to FIGS. 1-3, for example, jackpot device 10 can be integrated into a gaming table 20 to comprise a game device 21 of the present invention.

Table 20 is of the type used in casinos such as for playing the card game blackjack. Table 20 includes a semi-circular tabletop 23 that is supported by a semi-cylindrical base (not shown). Tabletop 23 includes a curved side 26 that is padded with a cushion 29 for player comfort. Cushion 29 has a foam core (not shown) covered with leather or other similarly suitable material. The flat upper surface 32 of tabletop 23 is covered with felt or other such material on which to play blackjack. A dealer runs the game of blackjack at table 20 while standing behind a straight side 35 of tabletop 23.

Table 20 includes seven player positions 38*a-g* for the players. A dealer position 41 includes respective areas 44 and 47 for displaying the dealer's common cards (not shown). Each of player positions 38*a-g* includes a respective wagering zone 50*a-g* for the individual players' wagers. Each wagering zone 50*a-g* has three separate main wagering areas 53*a-g*, 56*a-g*, and 59*a-g* for placing wagers on the primary blackjack game. Player positions 38*a-g* also include respective card areas 62*a-g* for receiving and displaying the playing cards dealt to the player at the particular player position 38*a-g*. Respective side wagering areas 65*a-g* are provided in wagering zones 50*a-g* for receiving side wagers. A shuffling machine (not shown) can be supported by the base of gaming table 20 at one side of the dealer position 41.

Prize Wheel

With continuing reference to FIGS. 1-3, prize wheel 12 includes a base 86. Base 86 may be of an oval shape so as to comfortably fit on upper surface 32 between card area 62*g*, cushion 29, and straight side 35 of tabletop 23. A flat upright frame 89 having a narrow lower portion 92 and a round upper portion 95 is affixed to base 86. A segmented disk 98 is rotationally mounted to upper portion 95. Segmented disk 98 is divided into a plurality of pie-shaped segments 101, 104, 107, 110, 113, 116, and 119 that denote winning various prizes. Segmented disk 98 further includes a pie-shaped jackpot segment 122 that denotes winning the incrementing jackpot.

Segmented disk 98 stops on only one of segments 101-122 each time spun so as to indicate a single prize won. This is accomplished by means of a plurality of pins 125 which extend perpendicularly from the outer periphery 128 of segmented disk 98. A downwardly directed pointer 131 is pivotally connected to an upward extension 134 of upright frame 89. Pointer 131 is resiliently biased to point downwardly to alternately contact pins 125 as segmented disk 98 rotates to randomly stop disk 98 on one of segments 101-122. This constitutes the "random" portion of the random incrementing jackpots when using jackpot device 10. When disk 98 is spun by hand and stops on the jackpot segment 122, a switch device in the form of a jackpot button 138 can be manually activated to signal micro-controller 14 through a cable 139 to stop incrementing the jackpot. The amount of the jackpot won is thus frozen on jackpot display 16.

Automatic Jackpot Control

An incrementing jackpot control system (not shown) can be incorporated into prize wheel 12 to automatically stop the incrementing of the jackpot when segmented disk 98 stops on the jackpot segment 122. This eliminates the need for jackpot button 138 to be used to stop the incrementing. The system includes a sensor and target arrangement such as a Hall effect sensor and magnet, an optical sensor and a target, or other such arrangement known in industry. The sensor is affixed to the upper portion 95 of frame 89 adjacent pointer 131. The target is affixed to the back surface (not shown) of segmented disk 98 along jackpot segment 122 adjacent outer periphery 128. The sensor and target pass closely together as segmented disk 98 spins. The sensor generates a signal whenever the target is in close proximity. Therefore, when segmented disk 98 is spinning, a plurality of short duration signals is sent by the sensor through cable 17 to micro-controller 14. If segmented disk 98 stops at the jackpot segment 122, a long duration signal is sent by the sensor along cable 17 to micro-controller 14 to stop incrementing the jackpot shown on jackpot display 16.

Automatic Spinning of Prize Wheel

An electric motor with clutch system (not shown) can be used with the incrementing jackpot control system to eliminate the need for hand-spinning segmented disk 98. One example of such a motor and clutch system comprises an electric motor that drives a clutch having an output shaft with a resilient drive wheel. The motor with clutch system is integrally built into prize wheel 12 with the drive wheel bearing against the annular outer surface of a tubular extension of segmented disk 98 (not shown) that extends perpendicularly from the rear surface of segmented disk 98. The electric motor drives segmented disk 98 when jackpot button 138 is actuated and is disconnected from segmented disk 98 by the clutch disengaging when jackpot button 138 is released or after being actuated for a predetermined or random period of time. This allows the drive wheel to freely spin along with segmented wheel 98 without the drag from the electric motor.

Micro-Controller

Micro-controller 14 includes a microprocessor, memory, and other associated electronics (not shown) known in the industry that perform the necessary electrical functions including that of a meter for incrementing the jackpot. If time-based incrementing is used, the operation of micro-controller 14 such as setting the minimum and maximum jackpots, holding at the maximum jackpot or scrolling, and the time period and the amount of each increment may be through a plurality of controls 140 with a plurality of light emitting diodes 141 showing the status of micro-controller 14. If progressive incrementing is used, then micro-controller 14 is connected to the electronics of the particular gaming device or devices such that the amount of the wagering is input into the micro-controller 14. The setting of the minimum and maximum jackpots, the holding at the maximum jackpot or scrolling, and the percentage of the wagers placed used to increment the jackpot may also be done using controls 140. Alternatively, a laptop computer (not shown) can be connected via a cable to a port (not shown) of micro-controller 14 to program the microprocessor and electronics.

Jackpot Display

Jackpot display 16 can be any of a number of standard designs known in the industry. Examples include those having a liquid crystal display (LCD), light emitting diodes (LED's), a cathode ray tube (CRT), or a stenciled backlit translucent material.

Method of Using Random Incrementing Jackpots for Card Games

Most any wagering game can be adapted for the method of including a random incrementing jackpot component of the present invention. One such method, as used in card games, is shown in the block diagram FIG. 4, such as used on game device 21 of FIG. 1. Prior to actual play, the casino determines the particular card or combinations of cards that will be needed to win a chance at the random incrementing jackpot, block 143. Actual play is started by the respective players making initial wagers on the primary card game by placing the desired number of chips in the respective main wagering areas 53*a-g*, 56*a-g*, and 59*a-g*. Any side wagers are placed with the desired number of chips in the respective side wagering area 65*a-g*, block 146. Cards are then dealt, and a hand or round of the primary card game is played to conclusion, block 149. If none of the players made a side wager, return is made to block 146 to start play again, block 152. If one or more players did place a side wager, determination must be made whether that player or players received the predetermined card combination, block 155. If not, the dealer collects all the side wagers and return is made to block 146 to start play again, block 158.

If one or more players did receive the predetermined card combination, the dealer collects all of the side wagers except for that of each winning player. Each winning player then gets the opportunity to win one of the random prizes including a portion of or the entire incrementing jackpot. This is done by each winning player or the dealer spinning segmented disk 98 of prize wheel 12, either manually by hand or automatically by actuating jackpot button 138, block 160. Each winning player receives whatever prize is associated with the segment 101-122 indicated by pointer 131 when segmented disk 98 stops spinning. Determination is made as to whether the randomly chosen bonus prize is the incrementing jackpot, block 161. If pointer 131 indicates any of segments 101-119, which are bonus prizes other than the incrementing jackpot, the winning player receives the particular bonus prize indicated, block 164. If the pointer 131 indicates the jackpot segment 122, then the incrementing of jackpot display 16 is stopped, either automatically or by using jackpot button 138, block 167. The winning player is paid the entire amount of the incrementing jackpot shown on the jackpot display 16 as the bonus, or a proportionate share if more than one winning player wins the incrementing jackpot during their individual spins, block 164.

Setting the Payouts for an Incrementing Jackpot of the Progressive Type

Figure 5:
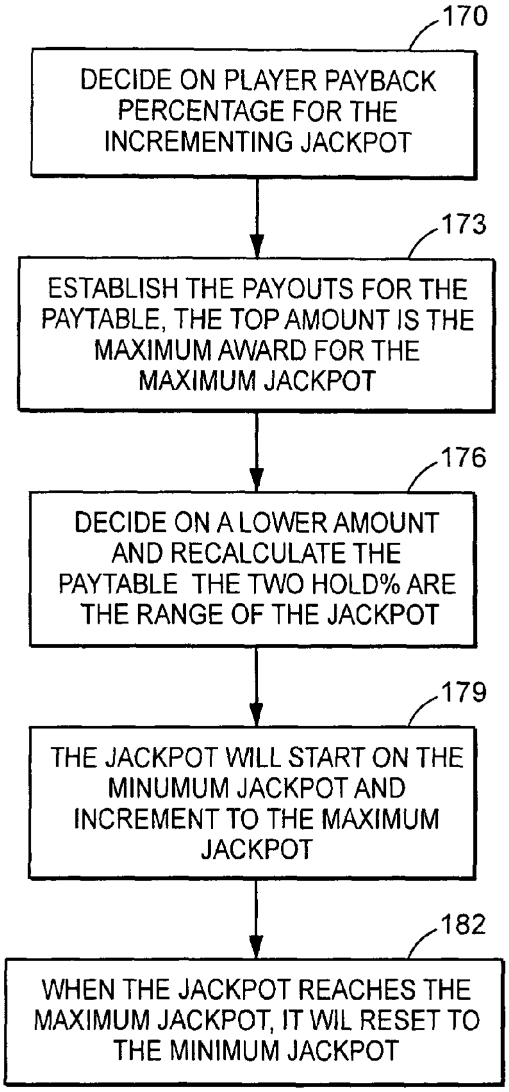
FIG. 5 is substantially a block diagram of the steps for determining the pay table for the incrementing jackpot.

The process for setting the payouts for an incrementing jackpot of the progressive type is shown in the block diagram FIG. 5, the process being similar to the time-based type. Initially, a player payback percentage for the incrementing jackpot is determined, block 170. This is primarily a financial decision to be made by the casino to satisfy the casino's requirements for earning money. The payouts for the pay table are established, the top amount being the maximum jackpot for the incrementing jackpot, block 173. A lower amount for the minimum jackpot is likewise established and the pay table recalculated. The two hold percent are the range of the jackpot, block 176. The minimum jackpot and the maximum jackpot are set so as to satisfy the player payback percentage and such that the average of the values of the jackpots and the probabilities of winning each within the range are equal to the amount of a desired fixed jackpot. The metering is set such that the jackpot starts at the minimum jackpot and increments to the maximum jackpot, block 179. When the maximum jackpot is reached, the meter resets to the minimum jackpot, block 182.

Setting Metering Speed of the Incrementing Jackpot

Figure 6:
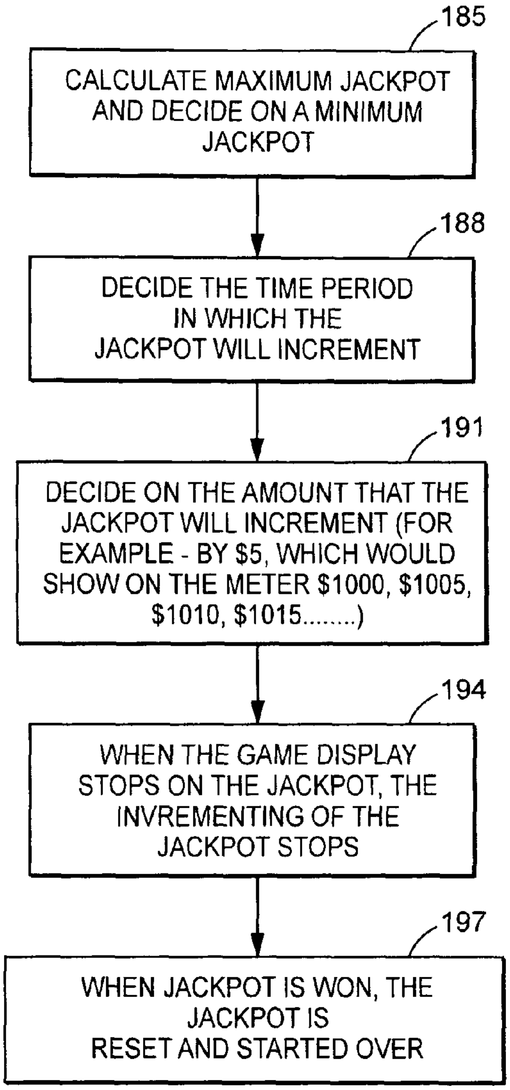
FIG. 6 is substantially a block diagram of the steps for setting meter specifications of the micro-controller for the incrementing jackpot.

The setting of the metering speed at which micro-controller 14 increments the jackpot is shown in the block diagram of FIG. 6. The setting of the metering speed begins with inputting the minimum and maximum jackpots determined in setting the payouts explained above, block 185. The time periods at which the meter of micro-controller 14 will increment the jackpot is then set, block 188. The amount the jackpot will increment each time period is then set, block 191. The time period and the amount by which the meter increments the jackpot are primarily marketing decisions based on what metering speed will best maintain the excitement and interest of the players. When the prize wheel 12 or other prize-generating device stops on the incrementing jackpot as the bonus prize, then meter of micro-controller 14 stops incrementing of the jackpot, block 194. The jackpot display 16 shows the amount of the incrementing jackpot won. Following winning of the jackpot, the meter of micro-controller 14 can be reset and started over at the minimum jackpot, block 197.

Programming the Micro-Controller

The meter specifications of the minimum and maximum jackpots, and the metering speed are entered into micro-controller 14 using the controls 140. Alternatively, a laptop computer can be connected to the port of micro-controller 14 to program the microprocessor and electronics of the micro-controller 14. Micro-controller 14 can also be programmed to increment from the minimum jackpot to the maximum jackpot, and upon reaching the maximum jackpot, the meter resets to the minimum jackpot. The incrementing jackpot thus scrolls continuously upwardly with the cycle repeating until won. Micro-controller 14 can alternatively be programmed to remain at the maximum jackpot until the jackpot is won, remain there for a predetermined period of time, or remain there until a predetermined date and/or time. Micro-controller 14 can also be programmed to reverse the direction of incrementing upon reaching the maximum jackpot to increment downward. The upward incrementing begins again upon reaching the minimum jackpot.

Example of a Time-Based Incrementing Jackpot for Card Games

The casino sets the metering speed of the incrementing jackpot so that it starts at a minimum jackpot of $1,000.00 and increments to a maximum jackpot of $10,000.00 every day. Upon reaching the maximum jackpot at the end of the day, the jackpot is reset to the minimum jackpot and starts incrementing again the next day. The payback percentage to the player on just the random jackpot varies from 80% to 84%. The incrementing meter represents 1% to 3% of the total payback percentage, which varies based on the jackpot amount when the player wins it.

Example of a Time-Based Incrementing Jackpot for Slots

The casino has set the metering speed of the incrementing jackpot so that it starts at a minimum jackpot of $1,000.00 and increments to a maximum jackpot of $10,000.00 every day. When the jackpot reaches the maximum jackpot at the end of the day, the jackpot is reset to the minimum jackpot and starts incrementing again the next day. The payback percentage to the player on all random jackpots varies from 13% to 15%. The incrementing meter represents 1% to 3% of the total payback percentage, which varies based on the jackpot amount when the player wins it.

Wheel of Madness Random Incrementing Jackpot

The Wheel of Madness is an example of a random incrementing jackpot for card games such as blackjack. The Wheel of Madness begins by players wishing to participate in the jackpot component of the card game each placing a side wager. A hand or round of the card game is played. If one or more of the players participating in the jackpot component receive a predetermined combination of playing cards, those winning players qualify for the random incrementing jackpot. Each winning player pushes a jackpot button that spins a prize wheel that randomly stops on any one of five fixed jackpots or one incrementing jackpot. The winning players win the jackpot on which the prize wheel stops. If more than one winning player wins the incrementing jackpot, they split the jackpot between themselves.

Jackpot Amounts and Probabilities of Winning Wheel of Madness

The six jackpots are as shown in the following chart. The five fixed jackpots range from $10.00 up to $50.00. There is a 1 in 1,875 chance of winning the incrementing jackpot on each spin of the prize wheel.

| Type of Jackpots | Number of Jackpots | Probability | Jackpot Amounts | Player Hold % |
|---|---|---|---|---|
| Incrementing | 1 | 0.00003 | 5,050 | 0.1300 |
| Fixed | 49 | 0.00126 | 50 | 0.0643 |
| Fixed | 100 | 0.00257 | 40 | 0.1055 |
| Fixed | 525 | 0.01351 | 12 | 0.1757 |
| Fixed | 575 | 0.01480 | 11 | 0.1776 |
| Fixed | 625 | 0.01609 | 10 | 0.1770 |
| Total | 1,875 | 0.04827 | 5,173 | 0.8300 |

Specifications for Wheel of Madness

The specifications for the Wheel of Madness are shown in the following chart. The incrementing jackpot ranges from a minimum jackpot of $100.00 to a maximum jackpot of $10,000.00. The meter increments the jackpot $1.00 every 15 seconds. When the incrementing reaches the maximum jackpot of $10,000.00, it starts over at the minimum jackpot of $100.00. The total cycle time for incrementing from the minimum jackpot of $100.00 to the maximum jackpot of $10,000.00 is 21.04 hours. The average pay is $5,050.00. The total cycle time coincides with the typical amount of time which casinos are open, being closed for cleaning about 3 hours per day. Therefore, the meter resets to the minimum jackpot each day.

| Incrementing Jackpot Specifications | |
|---|---|
| Range | $100 to $10,000 |
| Average Pay | $5,050 |
| Increment Rate | $ 1 |
| Increment Time | Every 15 seconds |
| Cycle Time | 21.04 Hours |

Hold % for Wheel of Madness

The jackpot Hold % is shown in the following chart. The overall Hold % for the jackpots is greatly influence by the amount of the jackpot which is won. The range of the incrementing jackpot can be changed to increase and decrease the minimum and maximum jackpots. Since the side wager is an optional bet, the Hold % from the bonus jackpots will add only about 2% to 4% to the hold % on the primary game such as the card game blackjack.

| Jackpot Hold % | |
|---|---|
| Minimum Player Hold % | 70.30% |
| Maximum Player Hold % | 95.80% |
| Minimum Casino Hold % | 29.70% |
| Maximum Casino Hold % | 4.20% |
| Average Player Hold % | 83% |
| Average Casino Hold % | 17% |

Multiple Card Tables Using a Common Random Incrementing Jackpot

Figure 7:
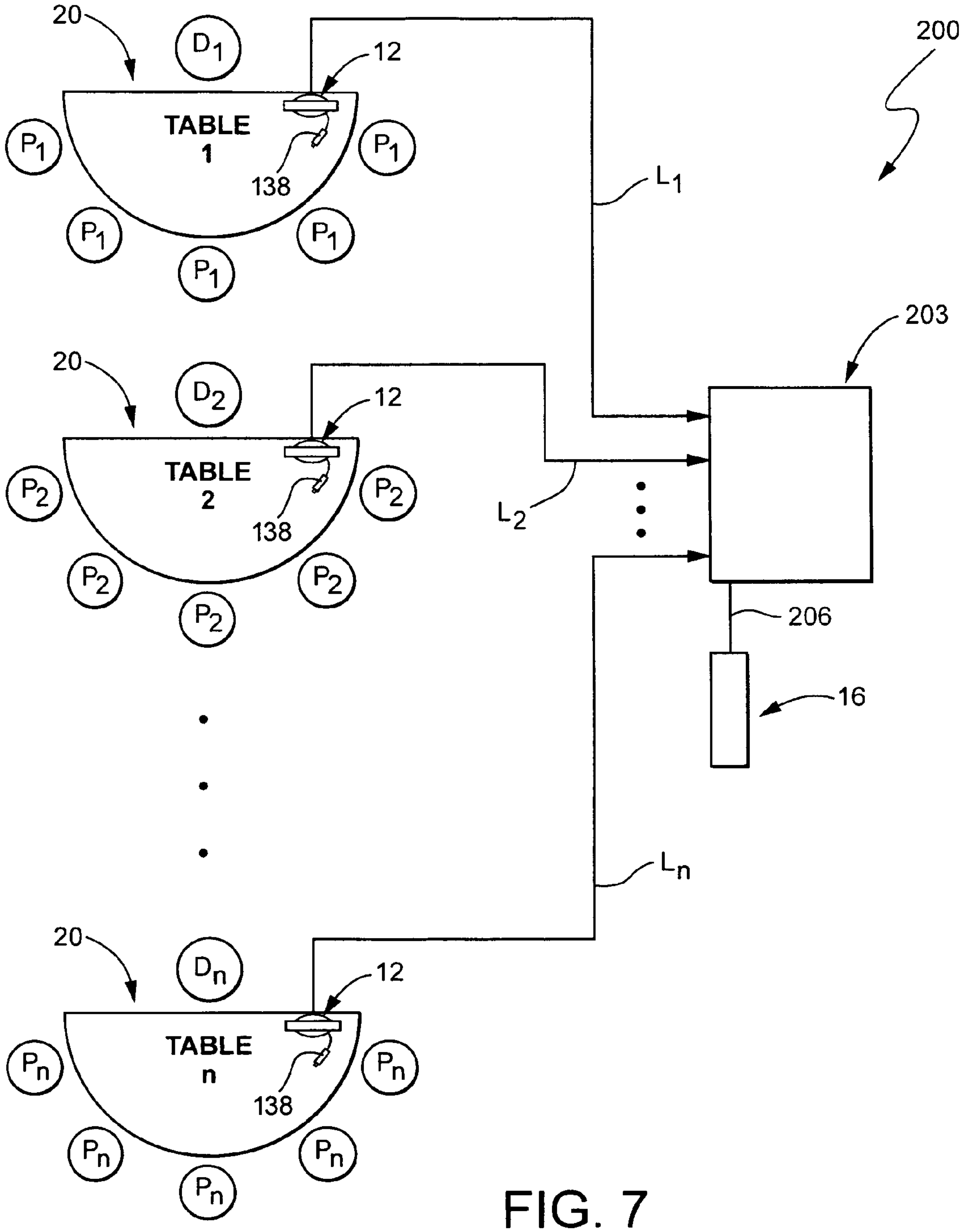
FIG. 7 is substantially a schematic diagram of a random incrementing jackpot device of the present invention that is adapted for networked use with multiple card tables.

A plurality of individual games can utilize a single random incrementing jackpot device as shown in FIG. 7. This allows bigger jackpots to be awarded and to increase competitiveness between players such as in a casino. A multiple random incrementing jackpot device 200 is shown which is used with a plurality of card games played at a plurality of individual gaming tables 20. The gaming tables 20 are designated Table 1, Table 2, . . . Table n, each table having a dealer designated D1, D2, . . . Dn. The players at the respective tables 20 are designated P1, P2, . . . Pn.

Jackpot device 200 includes a plurality of prize wheels 12 attached by means of respective electrical cables L1, L2, . . . Ln to a master micro-controller 203. Master micro-controller 203 is similar to micro-controller 14, but adapted for use with multiple prize wheels 12. Master micro-controller 203 is connected to a single jackpot display 16 by means of a cable 206. Jackpot device 200 operates in a similar manner to random incrementing jackpot device 10 except that players at multiple gaming tables 20 are competing for the same incrementing jackpot. As the individual card games are played at the respective gaming tables 20, winning players use respective jackpot buttons 138 to spin the disk 98 of respective prize wheels 12. If a prize other than the incrementing jackpot is won, the winning player gets that prize and the master micro-controller 203 continues to increment the jackpot. If a winning player wins the incrementing jackpot, the master micro-controller 203 stops incrementing the jackpot and that winning player wins the jackpot as shown on display 16. Master micro-controller 203 is then reset to the minimum jackpot to begin incrementing again.

Five Card Stud Table Using Random Incrementing Jackpots

Figure 8:
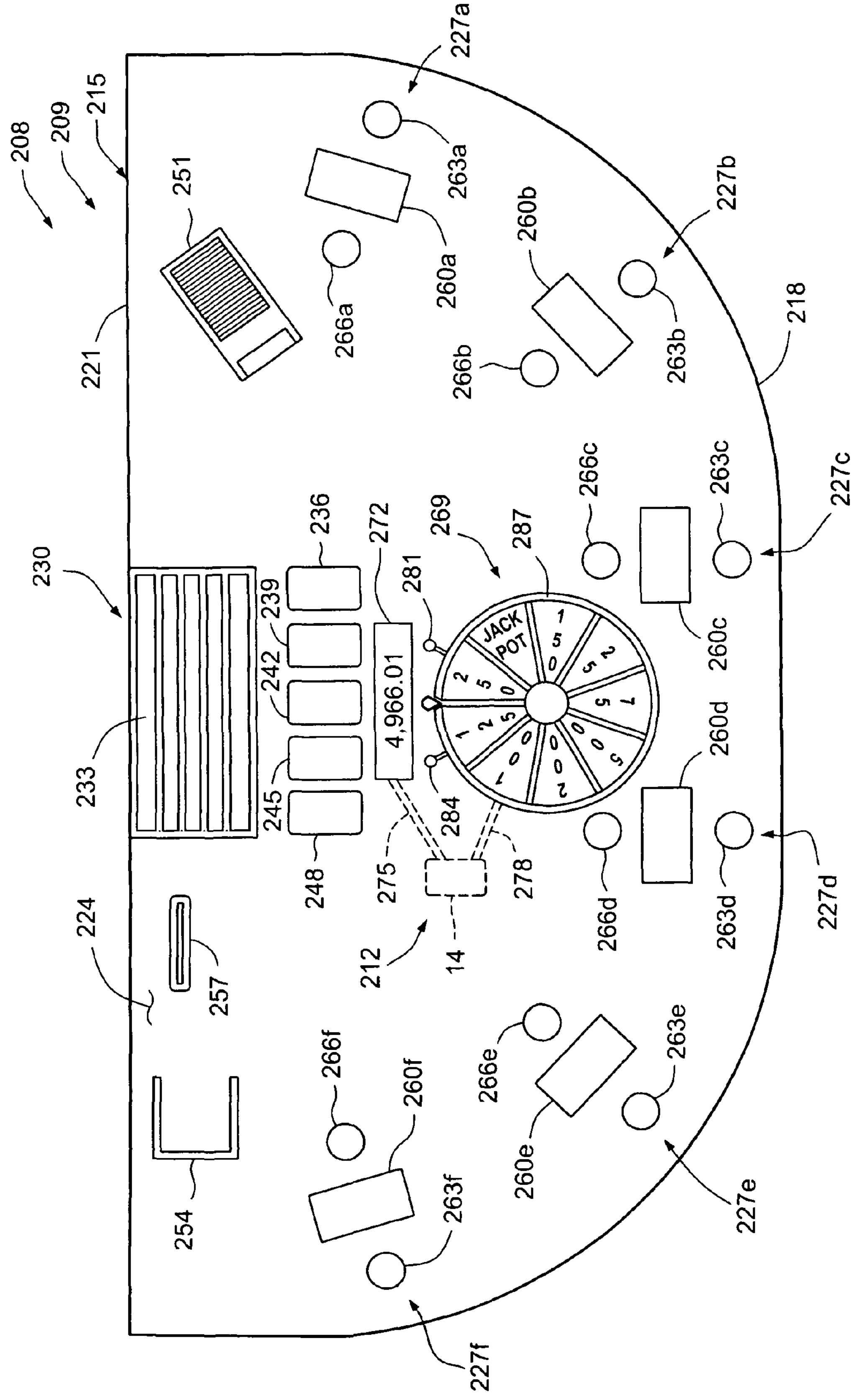
FIG. 8 is substantially a top plan view of a game device of the present invention comprising a five-card stud table and a random incrementing jackpot device.

A game device 208 is shown in FIG. 8 comprising a gaming table 209 such as used in casinos for playing the card game five-card stud and a random incrementing jackpot device 212 that is built into table 209. Table 209 includes an oblong, semi-circular tabletop 215 supported by a mating base (not shown). Tabletop 215 includes a curved side 218 that is padded with a cushion (not shown) for player comfort. A dealer runs the game of five-card stud at table 209 while standing behind a straight side 221 of tabletop 215. The flat upper surface 224 of tabletop 215 is covered with felt or other such material on which to play five card stud.

Table 209 includes six player positions 227*a-f* for the individual players. A dealer position 230 includes a chip rack 233 and respective areas 236, 239, 242, 245, and 248 for displaying the dealer's hand. A card shoe 251, a discard shoe 254, and a wager slot 257 are also included at dealer position 230. Each of the player positions 227*a-f* include a respective card area 260*a-f* for receiving playing cards dealt to the respective players. Player positions further include respective main wagering areas 263*a-f* and respective side wagering areas 266*a-f* for receiving side wagers. At one side of dealer position 230 can be included a shuffling machine (not shown) supported by the base of table 209.

Random incrementing jackpot device 212 includes a prize wheel 269 of similar design to prize wheel 12 except adapted for use in a horizontal position within table 209. Prize wheel 269 is covered by a protective glass plate (not shown). Jackpot device 212 further includes a micro-controller 14. Jackpot device 212 includes a jackpot display 272 of a similar but smaller design than jackpot display 16, being adapted for use within table 209. Jackpot display 272 and prize wheel 269 are respectively connected to micro-controller 14 by means of cables 275 and 278. A pair of jackpot buttons 281 and 284 is built into tabletop 215 positioned so as to be conveniently reachable across tabletop 215. Each of jackpot buttons 281 and 284 are connected to prize wheel 269 by means of cables (not shown). Jackpot buttons 281 and 284 each are actuatable to spin a segmented disk 286 of prize wheel 269 in a similar manner to segmented disk 98 of prize wheel 12 by means of an electric motor (not shown). The operation of jackpot device 212 is like that of jackpot device 10.

Slot Machine Using Random Incrementing Jackpots

Figure 9:
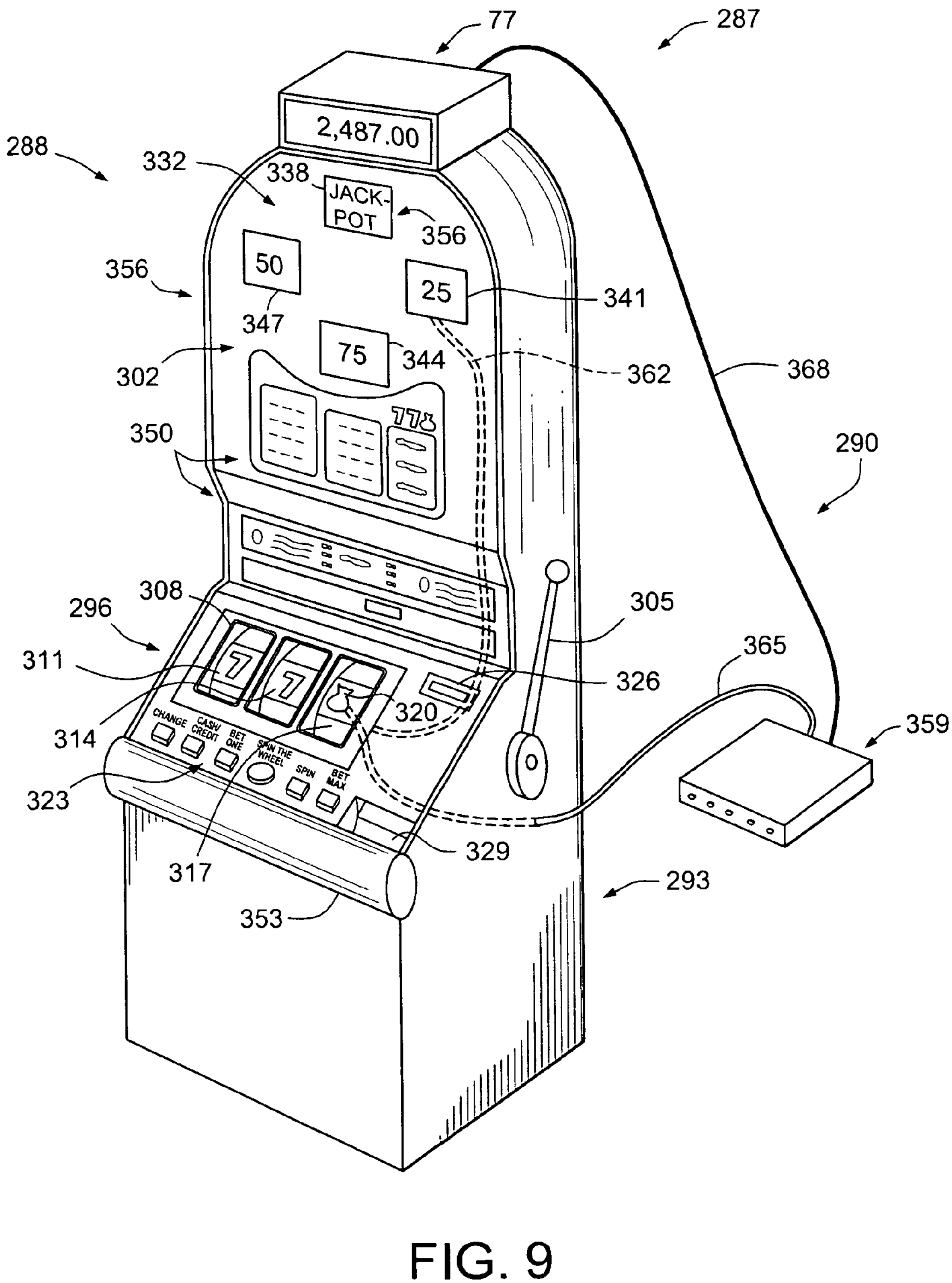
FIG. 9 is substantially a perspective view of a game device of the present invention comprising an electro-mechanical slot machine and a random incrementing jackpot device.

The random incrementing jackpot device can be adapted for use with other types of casino games. Shown in FIG. 9 is a game device 287 comprising an electro-mechanical slot machine 288 and a random incrementing jackpot device 290. Slot machine 288 includes a lower cabinet 293 with an angled control panel 296 to view and control game play. Slot machine 288 has an upper cabinet 299 that includes a display panel 302. A pull handle 305 is disposed at the side of slot machine 288 as is standard on slot machines. Control panel 296 includes a viewing window 308 through which a plurality of reels 311, 314, and 317 are visible having standard slot machine indicia. Reel 317 includes special jackpot indicia 320 which indicates in combination with a win on reels 311 and 314 that the random jackpot has been won. A plurality of operating buttons 323, a coin slot 326, and a coin return 329 are included on control panel 296. Display panel 302 includes a random jackpot display area 332 having a plurality of random jackpot designators 338, 341, 344, and 347. Each jackpot designator 341, 344, and 347 indicates a fixed jackpot that can be won. Jackpot designator 338 indicates the winning incrementing jackpot. A game playing instruction area 350 of display panel 302 details the rules of play to win the various jackpots. Slot machine 288 also includes a cushion 353 on lower cabinet 293 for player comfort.

Jackpot device 290 includes a random prize generating device 356 that is connected to display panel 302 for randomly choosing one of the respective random jackpot designators 338, 341, 344, and 347 to illuminate. A micro-controller 359 of jackpot device 290 operates in a similar manner to micro-controller 14 for incrementing the jackpot. A jackpot display 16 is mounted atop upper cabinet 299 for displaying the current amount of the incrementing jackpot. A reel spin and sensor mechanism (not shown) as known in the industry is operatively connected to reels 311, 314, and 317 for spinning and detecting the stopping positions thereof. Cables 362, 365, and 368 interconnect jackpot display 16, random prize generating device 356, micro-controller 359, and the reel spin and sensor mechanism.

Game device 287 is operated by first depositing one or more coins into coin slot 326. A wager of the desired number of coins is then placed using the operating buttons 323 on control panel 296. The reel spin and sensor mechanism is actuated to spin reels 311, 314, and 317 by actuating pull handle 305 or by using the operating buttons 323 on control panel 296. A winning combination of indicia on reels 311, 314, and 317 that includes the special jackpot indicia 320 as sensed by the reel spin and sensor mechanism causes a signal to be sent through cable 362 to random prize generating device 356. The signal triggers random prize generating device 356 to cause respective light bulbs thereof (not shown) to randomly light random jackpot designators 338, 341, 344, and 347. The lights stop randomly lighting with the one of jackpot designators 338, 341, 344, or 347 that is the last illuminated indicating the prize won. The incrementing jackpot is won if random jackpot designator 338 is the last illuminated. Upon winning of the incrementing jackpot, a signal is sent through cables 362 and 365 to micro-controller 359 which stops the incrementing of the jackpot shown on jackpot display 16. Note that while the micro-controller 359 and the jackpot display 16 are shown as being external of slot machine 288, they can also be integrally built into slot machine 288. Other types of electronic or other such type of display can replace random jackpot display area 332 provided an appropriately modified random prize generating device 356 is provided, such as a segmented wheel (not shown) having randomly alternately illuminated pie shaped segments similar to wheels 12 and 269. Such other displays can be separate or built into slot machine 287.

Multiple slot machines 288 can be networked together in a manner similar to that shown for gaming tables 20 in FIG. 7. A single master micro-controller and a single common display 16 allow players at multiple slot machines 288 to play for a larger incrementing jackpot or other such larger prizes.

Method of Using Random Incrementing Jackpots for Slots

Figure 4:
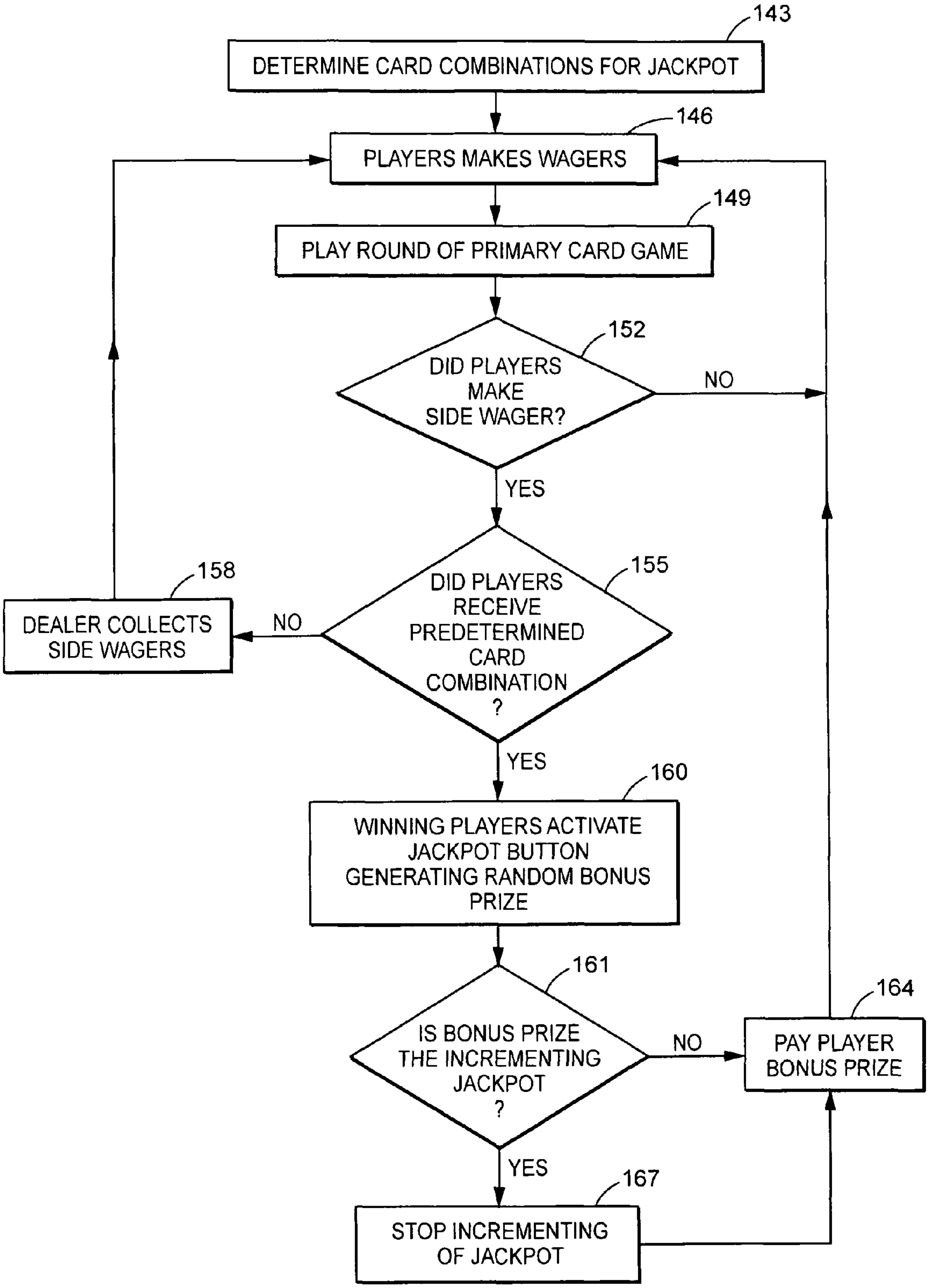
FIG. 4 is substantially a block diagram of a method of the present invention for using random incrementing jackpots in playing card games.
Figure 10:
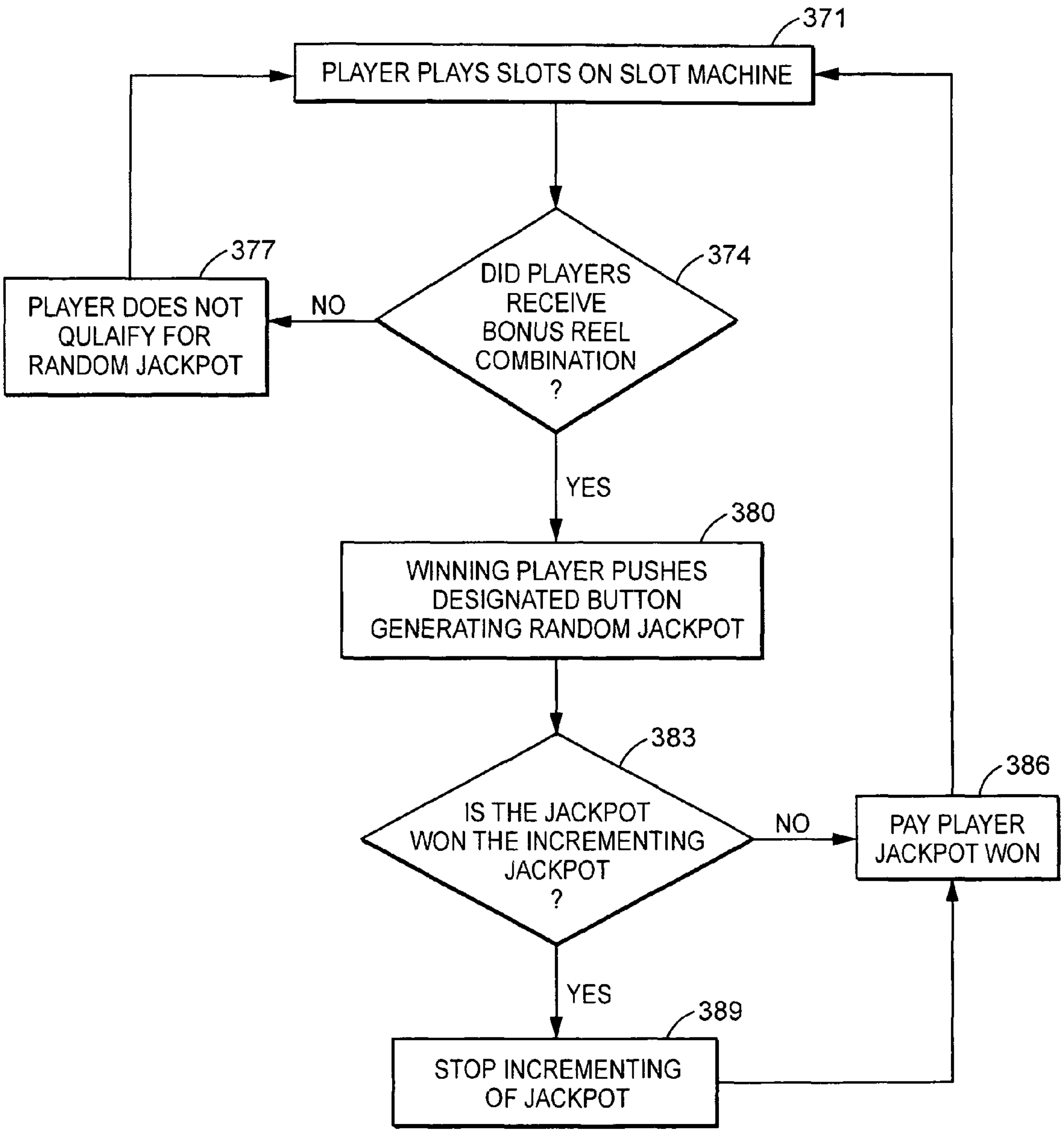
FIG. 10 is substantially a block diagram of a method of the present invention for using random incrementing jackpots in playing slots.

The method for using random incrementing jackpots for slots is similar to that shown for card games in the block diagram FIG. 4. FIG. 10 is a block diagram for one such method of using random incrementing jackpots in playing slots on game device 287. Initially, a player plays the slot machine 288 in the usual manner by depositing coins, wagering, and actuating the reels, block 371. Determination is then made whether a winning combination of indicia is received on reels 311, 314, and 317 that also includes the special jackpot indicia 320 on reel 317 (i.e. the bonus reel combination), block 374. If the reels 311, 314, and 317 stop without having the bonus reel combination, the player does not qualify for the random jackpot, block 377. Play resumes at the beginning, block 371. If the reels 311, 314, and 317 stop on the bonus reel combination, the winning player or players press one of the operating buttons 323 which is configured as a jackpot button to generate the random jackpot, block 380. Alternatively, slot machine 288 can automatically generate the random jackpot as explained above. Determination is then made whether the incrementing jackpot has been won, block 383. If other than the incrementing jackpot is indicated by one of jackpot designators 341, 344, or 347 being illuminated, the player wins the jackpot so indicated, block 386. If the incrementing jackpot is indicated by jackpot designator 338 being illuminated, then the incrementing of the jackpot is stopped, block 389. The player is paid the amount of the incrementing jackpot, block 386.

CONCLUSION

It can now be seen that the present invention solves many of the problems associated with the prior art. The present invention provides methods, incrementing jackpot devices, and game devices that include a jackpot component in a primary wagering game as part of the underlying or primary game, or as a separate side wager. The present invention further provides an incrementing jackpot as one of a number of possible bonus prizes which can be won by random selection. The present invention still further provides increased player excitement to wagering games making such games more interesting and exciting to retain the players wagering for a longer time period increasing casino profits.

Although the description above contains many specifications, these should not be construed as limiting the scope of the invention but as merely providing illustrations of some of presently preferred embodiments of this invention. The specification, for instance, makes reference to wagering games such as standard casino card games, slots, and other such casino games. However, the present invention is not intended to be limited to casino use nor to standard casino wagering games. Rather it is intended that the present invention can be used in any type of game where a jackpot component is desired. Likewise, while wagering games are preferred, the present invention can be used such as with casino games wherein money wagers are not placed such as for charity events. Also, the present invention can be used to provide increased player interest and excitement to other games in which wagers are typically not placed. Likewise, while a random jackpot wheel can be the random jackpot generating device, the random jackpot wheel can be replaced by a lighted display case which lights up each jackpot or other prize contained therein one at a time and then stops with the only one jackpot or other prize illuminated, which is the jackpot won. Alternatively, a winning player could pick one box from a variety of boxes each concealing a different jackpot or other prize. Finally, a winning player could choose, or be automatically chosen for the player, an animated character from a variety of animated characters (e.g. race horses) that participates in some sort of race or other contest, with the player being awarded a random jackpot based on the outcome of the contest. Thus, the scope of the invention should be determined by the appended claims and their legal equivalents rather than by the examples given.

TERMS

10. [game device] random incrementing jackpot device
12. [jackpot device] prize wheel
14. [jackpot device] micro-controller
16. [jackpot device] jackpot display
17. [jackpot device] cable
18. [jackpot device] cable
20. [game device] gaming table
21. game device
23. [table] semi-circular tabletop
26. [table top] curved side
29. [table] cushion
32. [table top] flat upper surface
35. [table top] straight side
38*a-g*. [table] player position
41. [table] dealer position
44. [dealer position] dealer's common card display area
47. [dealer position] dealer's common card display area
50*a-g*. [player position] wagering zone
53*a-g*. [wagering zone] main wagering area
56*a-g*. [wagering zone] main wagering area
59*a-g*. [wagering zone] main wagering area
62*a-g*. [player position] card area
65*a-g*. [wagering zone] side wagering area
86. [wheel] base
89. [wheel] upright frame
92. [frame] narrow lower portion
95. [frame] round upper portion
98. [wheel] segmented disk
101. [disk] pie-shaped segment
104. [disk] pie-shaped segment
107. [disk] pie-shaped segment
110. [disk] pie-shaped segment
113. [disk] pie-shaped segment
116. [disk] pie-shaped segment
119. [disk] pie-shaped segment
122. [disk] pie-shaped jackpot segment
125. [disk] pin
128. [disk] outer periphery
131. [wheel] pointer
134. [upper portion] upward extension
138. [wheel] jackpot button
139. [wheel] cable
140. [micro-controller] control
141. [micro-controller] light emitting diode
143. [card game] block
146. [card game] block
149. [card game] block
152. [card game] block
155. [card game] block
158. [card game] block
160. [card game] block
161. [card game] block
164. [card game] block
167. [card game] block
170. [jackpot] block
173. [jackpot] block
176. [jackpot] block
179. [jackpot] block
182. [jackpot] block
185. [speed] block
188. [speed] block
191. [speed] block
194. [speed] block
197. [speed] block
200. [gaming device] multiple random incrementing jackpot device
203. [jackpot device] master micro-controller
206. [jackpot device] cable
208. game device
209. [game device] gaming table
212. [game device] random incrementing jackpot device
215. [gaming table] oblong, semi-circular table top
218. [table top] curved side
221. [table top] straight side
224. [table top] upper surface
227*a-f*. [table] player position
230. [table] dealer position
233. [dealer position] chip rack
236. [dealer position] dealer's hand display area
239. [dealer position] dealer's hand display area
242. [dealer position] dealer's hand display area
245. [dealer position] dealer's hand display area
248. [dealer position] dealer's hand display area
251. [dealer position] card shoe
254. [dealer position] discard shoe
257. [dealer position] wager slot
260. [player position] card area
263*a-f*. [player position] main wagering area

266*a-f*. [player position] side wagering area
269. [jackpot device] prize wheel
272. [jackpot device] jackpot display
275. [jackpot device] cable
278. [jackpot device] cable
281. [jackpot device] jackpot button
284. [jackpot device] jackpot button
286. [wheel] segmented disk
287. game device
288. [game device] electro-mechanical slot machine
290. [game device] random incrementing jackpot device
293. [slot machine] lower cabinet
296. [lower cabinet] control panel
299. [slot machine] upper cabinet
302. [upper cabinet] display panel
305. [slot machine] pull handle
308. [control panel] viewing window
311. [slot machine] reel
314. [slot machine] reel
317. [slot machine] reel
320. [reel] special jackpot indicia
323. [control panel] operating button
326. [control panel] coin slot
329. [control panel] coin return
332. [display panel] random jackpot display area
338. [random jackpot display area] random jackpot designator
341. [random jackpot display area] random jackpot designator
344. [random jackpot display area] random jackpot designator
347. [random jackpot display area] random jackpot designator
350. [display panel] game playing instruction area
353. [slot machine] cushion
356. [jackpot device] random prize generating device
359. [jackpot device] micro-controller
362. [jackpot device] cable
365 [jackpot device] cable
368. [jackpot device] cable
371. [slots] block
374. [slots] block
377. [slots] block
380. [slots] block
383. [slots] block
386. [slots] block
389. [slots] block

What is claimed is:

1. A gaming device comprising:

(A) a primary game of chance apparatus configured to allow at least one player to place a wager and present a game of chance having a primary game outcome, the primary game outcome comprising awarding at least one prize including at least one fixed jackpot, the primary game outcome further comprising at least one bonus qualifying event;

(B) a bonus game of chance apparatus adapted to present the at least one player with a bonus game if the primary game outcome comprises the bonus qualifying event, the bonus game of chance apparatus having a randomly determined bonus game outcome, the bonus game outcome comprising awarding a plurality of bonus prizes, at least one bonus prize comprising an incrementing jackpot;

(C) a game controller in communication with the primary game of chance and the bonus game of chance, the game controller comprising game outcome odds comprising odds for awarding the at least one prize in the primary game, odds for obtaining the at least one bonus qualifying event, odds for awarding the plurality of bonus prizes in the bonus game, and odds for winning the incrementing jackpot, wherein the game outcome odds are interrelated, wherein the game controller determines whether the at least one player has obtained the bonus game qualifying event during the at least one round of the primary wagering game and the game controller determines, based on a random determination, the at least one gaming prize for the at least one player, the random determination being based at least in part on the odds of winning the plurality of bonus prizes, wherein the plurality of gaming prizes includes the incrementing jackpot and the at least one fixed prize jackpot.

2. The gaming device of claim 1, wherein the game controller is programmable to set a minimum and a maximum value for the incrementing jackpot.

3. The gaming device of claim 1, wherein the incrementing of the jackpot is progressive based on increasing a predetermined percentage of a total amount of wagers placed.

4. The gaming device of claim 1, wherein the incrementing of the jackpot is time-based and increments the incrementing jackpot at predetermined time intervals.

5. The gaming device of claim 1, wherein the game controller is configured to automatically stop incrementing the incrementing jackpot when the bonus game outcome comprises the incrementing jackpot.

6. The gaming device of claim 1, further comprising an input device connected to the game controller, the input device being hand-operable to manually stop the incrementing of the incrementing jackpot after the bonus game outcome comprises the incrementing jackpot.

7. The gaming device of claim 1, the bonus game of chance apparatus comprising a rotatable, segmented prize wheel.

8. The gaming device of claim 1, the bonus game of chance apparatus comprising a rotatable, segmented prize wheel, a jackpot button, and a motor operatively connected to the segmented prize wheel, the jackpot button being handoperable to cause the segmented prize wheel to spin by means of the motor, wherein the segmented prize wheel may stop on one of a plurality of segments of the segmented prize wheel to indicate the bonus game outcome.

9. The gaming device of claim 1, further comprising a jackpot display operatively coupled to the game controller for displaying the value of the incrementing jackpot.

10. The gaming device of claim 9, wherein the game controller is adapted to be in communication with a plurality of game devices such that the incrementing of the jackpot display stops when a bonus game outcome of any of the plurality of game devices comprises the incrementing jackpot.

11. The gaming device of claim 1, wherein the primary game of chance apparatus comprises a gaming table for playing card games.

12. The gaming device of claim 11, the bonus game of chance apparatus comprising a display comprising a wheel built into the gaming table.

13. The gaming device of claim 1 wherein the primary game of chance apparatus comprises a slot machine.

14. The gaming device of claim 12 wherein the slot machine comprises an electro-mechanical slot machine having generally cylindrical rotatable reels.

15. The gaming device of claim 12 wherein the slot machine comprises a video gaming device having a plurality of virtual reels shown on a video screen.

* * * * *